United States Patent
Kang et al.

(10) Patent No.: US 12,505,353 B2
(45) Date of Patent: Dec. 23, 2025

(54) METHOD AND APPARATUS FOR TRAINING LANGUAGE MODEL FOR MULTI-MODAL DIALOG

(71) Applicants: SAMSUNG SDS CO., LTD., Seoul (KR); SEOUL NATIONAL UNIVERSITY R&DB FOUNDATION, Seoul (KR)

(72) Inventors: Hoyoung Kang, Seoul (KR); Kyoungwon Park, Seoul (KR); Seongho Joe, Seoul (KR); Youngjune Gwon, Seoul (KR); Gunhee Kim, Seoul (KR); Sangho Lee, Seoul (KR); Jaewoo Ahn, Seoul (KR)

(73) Assignees: SAMSUNG SDS CO., LTD., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 551 days.

(21) Appl. No.: 17/985,286

(22) Filed: Nov. 11, 2022

(65) Prior Publication Data

US 2023/0153630 A1    May 18, 2023

(30) Foreign Application Priority Data

Nov. 12, 2021 (KR) .................. 10-2021-0155612
Mar. 30, 2022 (KR) .................. 10-2022-0039804

(51) Int. Cl.
| | | |
|---|---|---|
| G06F 17/27 | (2006.01) | |
| G06F 40/166 | (2020.01) | |
| G06F 40/284 | (2020.01) | |
| G06F 40/35 | (2020.01) | |
| G06N 3/091 | (2023.01) | |

(52) U.S. Cl.
CPC .......... *G06N 3/091* (2023.01); *G06F 40/166* (2020.01); *G06F 40/284* (2020.01); *G06F 40/35* (2020.01)

(58) Field of Classification Search
CPC ........ G06F 40/30; G06F 40/35; G06F 40/284; G06F 40/166; G06V 30/416; G06V 30/418
USPC .......................................................... 704/9
See application file for complete search history.

(56) References Cited

U.S. PATENT DOCUMENTS

| | | | |
|---|---|---|---|
| 2021/0312628 A1 | 10/2021 | Larlus-Larrondo et al. | |
| 2022/0156300 A1* | 5/2022 | Paruchuri | G06V 30/416 |
| 2022/0222435 A1* | 7/2022 | Lin | G06F 40/30 |
| 2024/0282094 A1* | 8/2024 | Tsimpoukelli | G06F 40/284 |

* cited by examiner

*Primary Examiner* — Md S Elahee
(74) *Attorney, Agent, or Firm* — Sughrue Mion, PLLC

(57) ABSTRACT

A method for training a language model for multimodal dialog includes generating a first token sequence by tokenizing one or more text messages included in multimodal dialog data, generating a second token sequence by inserting, based on an appearance position of an image included in the multimodal dialog data, one or more image presence tokens and one or more image non-presence tokens into the first token sequence, and replacing one or more tokens among a plurality of tokens generated by the tokenization with a mask token, generating one or more feature vectors for the image, and training an artificial neural network-based language model to predict, based on the second token sequence and the one or more feature vectors, an appearance position of the image in the multimodal dialog data.

16 Claims, 12 Drawing Sheets

METHOD AND APPARATUS FOR TRAINING LANGUAGE MODEL FOR MULTI-MODAL DIALOG

CROSS-REFERENCE TO RELATED APPLICATION AND CLAIM OF PRIORITY

This application claims benefit under 35 USC § 119 of Korean Patent Application Nos. 10-2021-0155612 filed on Nov. 12, 2021 and 10-2022-0039804 filed on Mar. 30, 2022, in the Korean Intellectual Property Office, the disclosure of which is incorporated herein by reference in its entirety.

BACKGROUND

1. Field

One or more embodiments relate to a technique for training a language model for multimodal dialog.

A technique for training a deep learning model using a task that can be undertaken only with a large amount of data without labels is known as self-supervised learning. Self-supervised learning is usually applied during pre-learning with a pretext task. A method of fine-tuning the trained model with a small amount of data with labels in accordance with a downstream task has been mainly used. In the field of natural language processing (NLP), great results have been achieved by training a self-supervised learning method for transformer-based models, in particular, models such as bidirectional encoder representations from transformers (BERT). Attempts to apply such a method to multimodal data including images, texts, and audio have been made.

It is very important to generate a task that can be trained without labels in pre-learning of self-supervised learning. In computer vision (CV), a contrastive learning method has been mainly used. In NLP, a masked language model (MLM) method and a next sentence prediction (NSP) method have been mainly used. With respect to multimodal models in which CV and NLP need to be integrated, texts and images are sequentially input, and a masked multimodal learning method and a multimodal alignment prediction method similar to the MLM method have been used.

However, as a multimodal issue such as visual question answering (VQA) become more complicated, there are increasing cases in which desired performance cannot be obtained by a learning method according to related art. For example, in a visual dialog or VQA 2.0 dataset according to the related art, a question-and-answer session focuses on an image from the beginning to the end in a state in which the image is presented. In an issue such as a multimodal dialog dataset (MMDD) or a photochat dataset, an image appears more than once in the middle of a more natural dialog, and the dialog proceeds. Through the learning method according to the related art, it is difficult to generate a model operating effectively when given such an issue that is more similar to an actual daily dialog situation, and a model trained through the method according to the related art is more likely to make decisions out of context before an image is given or when an image is switched to another image.

Therefore, in order to understand multimodal dialog close to an actual situation, there is a need for a new model learning method that can understand a change of context.

SUMMARY

An aspect provides a method and apparatus for training a language model for multimodal dialog.

According to an aspect, there is provided a method for training a language model for multimodal dialog, the method including generating a first token sequence by tokenizing one or more text messages included in multimodal dialog data, generating a second token sequence by inserting, based on an appearance position of an image included in the multimodal dialog data, one or more image presence tokens and one or more image non-presence tokens into the first token sequence, and replacing one or more tokens among a plurality of tokens generated by the tokenization with a mask token, generating one or more feature vectors for the image, and training an artificial neural network-based language model to predict, based on the second token sequence and the one or more feature vectors, an appearance position of the image in the multimodal dialog data.

The generating the second token sequence may include generating the second token sequence by inserting the image presence token into a position corresponding to a position in which the image appears among a position immediately before or after each of the one or more text messages appears in the multimodal dialog data, and inserting the image non-presence token into a position corresponding to a position in which the image does not appear among the position immediately before or the position immediately after each of the one or more text messages appears in the multimodal dialog data.

The training may include training the language model using a first loss function based on an output vector of the language model for the mask token, and a second loss function based on a first similarity between an output vector of the language model for the image presence token and an output vector of the language model for the one or more feature vectors and a second similarity between an output vector of the language model for the image non-presence token and the output vector of the language model for the one or more feature vectors.

The training may include predicting, based on the first loss function, a token replaced with the mask token in the first token sequence, and training, based on the second loss function, the language model such that the first similarity increases and the second similarity decreases.

According to another aspect, there is provided an apparatus for training a language model for multimodal dialog, the apparatus including a tokenizer configured to generate a first token sequence by tokenizing one or more text messages included in multimodal dialog data, a token inserter configured to generate a second token sequence by inserting, based on an appearance position of an image included in the multimodal dialog data, one or more image presence tokens and one or more image non-presence tokens into the first token sequence, and replacing one or more tokens among a plurality of tokens generated by the tokenization with a mask token, a feature vector generator configured to generate one or more feature vectors for the image, and a trainer configured to train an artificial neural network-based language model to predict, based on the second token sequence and the one or more feature vectors, an appearance position of the image in the multimodal dialog data.

The token inserter may be configured to generate the second token sequence by inserting the image presence token into a position corresponding to a position in which the image appears among a position immediately before or after each of the one or more text messages appears in the multimodal dialog data, and inserting the image non-presence token into a position corresponding to a position in which the image does not appear among the position immediately before or the position immediately after each of the one or more text messages appears in the multimodal dialog data.

The trainer may be configured to train the language model using a first loss function based on an output vector of the language model for the mask token, and a second loss function based on a first similarity between an output vector of the language model for the image presence token and an output vector of the language model for the one or more feature vectors and a second similarity between an output vector of the language model for the image non-presence token and the output vector of the language model for the one or more feature vectors.

The trainer may be configured to predict, based on the first loss function, a token replaced with the mask token in the first token sequence, and to train, based on the second loss function, the language model such that the first similarity increases and the second similarity decreases.

According to another aspect, there is provided a method for training a language model for multimodal dialog, the method including classifying, based on an appearance position of an image included in first multimodal dialog data, one or more text messages included in the first multimodal dialog data into one or more message groups, generating second multimodal dialog data by changing appearance positions of the one or more message groups and the image in the first multimodal dialog data, generating a first token sequence by tokenizing respective text messages included in the one or more message groups in the second multimodal dialog data, generating, based on the appearance position of the image in the second multimodal dialog data, a second token sequence in which one or more image presence tokens and one or more image non-presence tokens are inserted into the first token sequence, generating one or more feature vectors for the image, and training an artificial neural network-based language model to predict, based on the second token sequence and the one or more feature vectors, the appearance positions of the image and the one or more message groups in the first multimodal dialog data.

The generating the second token sequence may include generating the second token sequence by inserting the image presence token into a position corresponding to a position in which the image appears among a position immediately before or after each of the one or more text messages appears in the second multimodal dialog data, and inserting the image non-presence token into a position corresponding to a position in which the image does not appear among the position immediately before or the position immediately after each of the one or more text messages appears in the second multimodal dialog data.

The training may include training the language model using a loss function based on maximum likelihood estimation.

The second token sequence may include a special token indicating start of each of the one or more message groups, and the training may include predicting, based on an output vector of the language model for each of the special token and the image presence token, an appearance position of each of the one or more message groups and the image in the first multimodal dialog data, and training the language model such that the loss function is maximized.

According to another aspect, there is provided an apparatus for training a language model for multimodal dialog, the apparatus including a grouper configured to classify, based on an appearance position of an image included in first multimodal dialog data, one or more text messages included in the first multimodal dialog data into one or more message groups, and to generate second multimodal dialog data by changing appearance positions of the one or more message groups and the image in the first multimodal dialog data, a tokenizer configured to generate a first token sequence by tokenizing respective text messages included in the one or more message groups in the second multimodal dialog data, a token inserter configured to generate, based on the appearance position of the image in the second multimodal dialog data, a second token sequence in which one or more image presence tokens and one or more image non-presence tokens are inserted into the first token sequence, a feature vector generator configured to generate one or more feature vectors for the image, and a trainer configured to train an artificial neural network-based language model to predict, based on the second token sequence and the one or more feature vectors, the appearance positions of the image and the one or more message groups in the first multimodal dialog data.

The token inserter may be configured to generate the second token sequence by inserting the image presence token into a position corresponding to a position in which the image appears among a position immediately before or after each of the one or more text messages appears in the second multimodal dialog data, and inserting the image non-presence token into a position corresponding to a position in which the image does not appear among the position immediately before or the position immediately after each of the one or more text messages appears in the second multimodal dialog data.

The trainer may be configured to train the language model using a loss function based on maximum likelihood estimation.

The second token sequence may include a special token indicating start of each of the one or more message groups, and the trainer may be configured to predict, based on an output vector of the language model for each of the special token and the image presence token, an appearance position of each of the one or more message groups and the image in the first multimodal dialog data, and to train the language model such that the loss function is maximized.

According to example embodiments, performance of a learning model may be improved even in a natural dialog in which context of multimodal dialog data appears freely.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Hereinafter, specific example embodiments of the present disclosure will be described with reference to the accompanying drawings. The following detailed description is provided to aid in a comprehensive understanding of a method, a device and/or a system described in the present specification. However, the detailed description is for illustrative purposes only, and the present disclosure is not limited thereto.

In describing the example embodiments of the present disclosure, when it is determined that a detailed description of a known technology related to the present disclosure may unnecessarily obscure the gist of the present disclosure, the detailed description thereof will be omitted. In addition, terms to be described later are terms defined in consideration of functions in the present disclosure, which may vary depending on intention or custom of a user or operator. Therefore, the definition of these terms should be made based on the contents throughout the present specification. The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Figure 1:
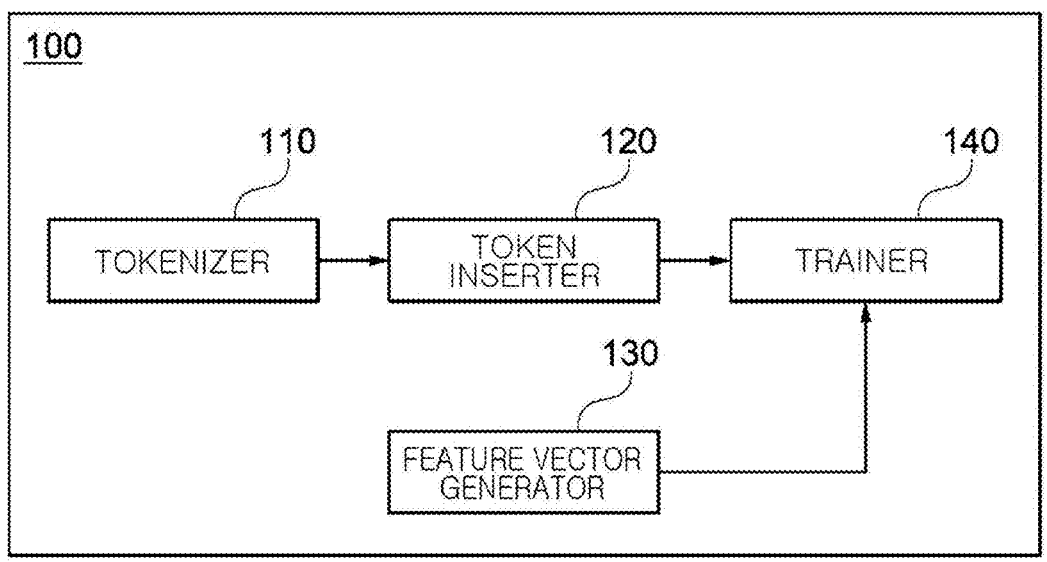
FIG. 1 is a block diagram illustrating an apparatus for training a language model according to an example embodiment.

FIG. 1 is a block diagram illustrating an apparatus for training a language model according to an example embodiment.

Referring to FIG. 1, a language model training apparatus 100 according to an example embodiment may include a tokenizer 110, a token inserter 120, a feature vector generator 130, and a trainer 140.

The language model training apparatus 100 according to an example embodiment may be the apparatus 100 for training a language model using multimodal dialog data including one or more text messages and one or more images.

According to an example embodiment, the tokenizer 110, the token inserter 120, the feature vector generator 130, and the trainer 140 may be implemented by one or more hardware processors or a combination of one or more hardware processors and software, and may not be clearly distinguished in specific operations, unlike the illustrated example.

Hereinafter, multimodal dialog refers to a dialog performed between two or more speakers using a text message and an image, and the multimodal dialog data includes one or more text messages and one or more images exchanged between speakers in multimodal dialog.

The tokenizer 110 may generate a first token sequence by tokenizing each of the one or more text messages included in the multimodal dialog data.

According to an example embodiment, the tokenizer 110 may tokenize each of the one or more text messages by dividing each of the one or more text messages included in the multimodal dialog data in a preset unit. Specifically, the tokenizer 110 may tokenize, based on, for example, a character unit, a word unit, a subword unit, a morpheme unit, a whitespace unit, or the like, each of the one or more text messages included in the multimodal dialog data. However, a unit for tokenization may be set in various manners in some example embodiments other than the above-described example.

The first token sequence may include a plurality of tokens generated by tokenizing respective text messages included in the multimodal dialog data, and each of the plurality of tokens may be sequentially arranged in the first token sequence according to an appearance position thereof in the multimodal dialog data.

In addition, according to an example embodiment, the first token sequence may further include one or more preset special tokens such as a token indicating start and end of a token sequence, a token for distinguishing a token for each text message, and the like, in addition to the plurality of tokens generated by tokenizing the respective text message included in the multimodal dialog data.

The token inserter 120 may generate a second token sequence by inserting, based on an appearance position of an image in the multimodal dialog data, one or more image presence tokens and one or more image non-presence tokens into the first token sequence, and replacing one or more tokens among the plurality of tokens included in the first token sequence with a mask token.

In this case, the image presence token may refer to a special token indicating a position in which an image appears in the multimodal dialog data, and the image non-presence token may refer to a special token indicating a position in which the image does not appear in the multimodal dialog data. Specifically, according to an example embodiment, the token inserter 120 may insert an image presence token into a position corresponding to a position in which the image appears among a position immediately before or after each text message appears in the multimodal dialog data. In addition, the token inserter 120 may insert an image non-presence token into a position corresponding to a position in which the image does not appear among the position immediately before or the position immediately after each text message appears in the multimodal dialog data.

According to an example embodiment, the token inserter 120 may replace some of the plurality of tokens included in the first token sequence with the mask token according to a preset ratio. In addition, in some example embodiments, the token inserter 120 may replace one or more tokens among the tokens included in the first token sequence with an arbitrary token.

Figure 2:
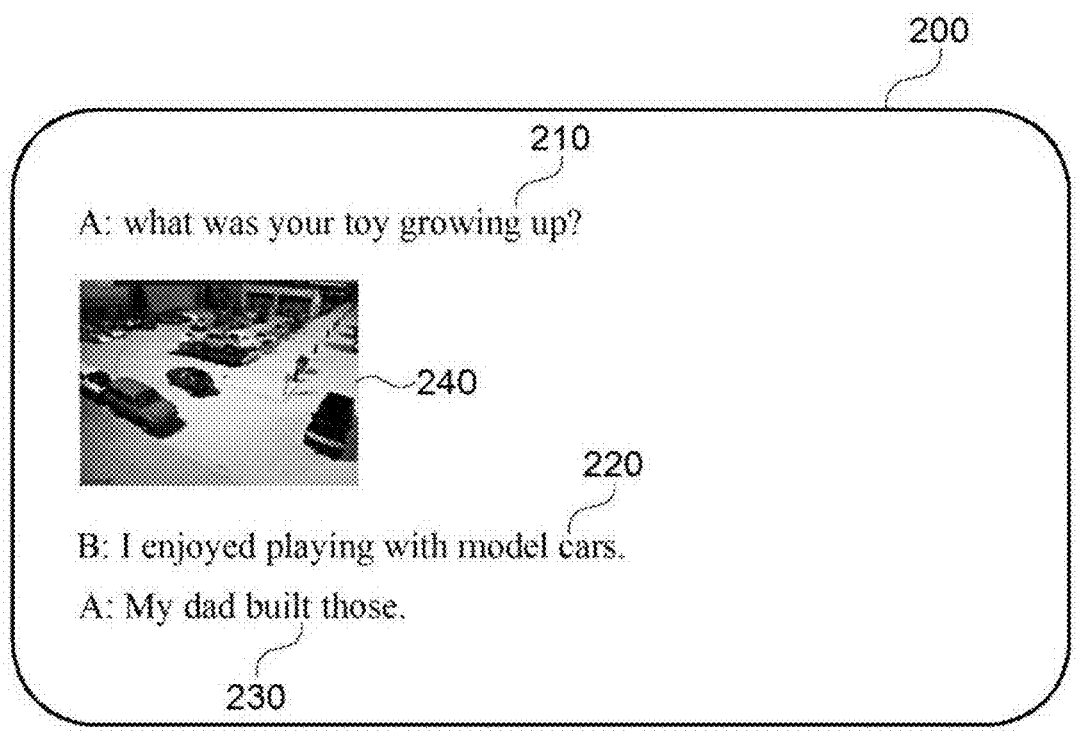
FIG. 2 is a diagram illustrating an example of multimodal dialog data.
Figure 3:
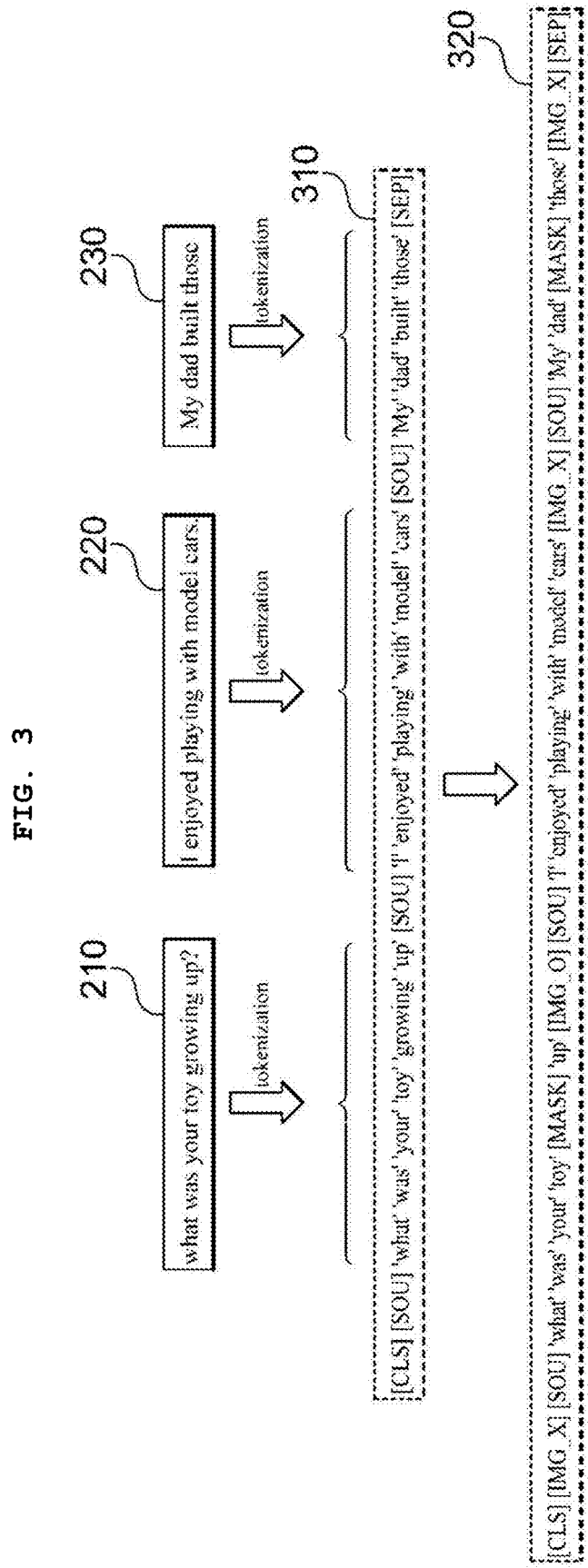
FIG. 3 is an exemplary diagram illustrating generation of a token sequence according to an example embodiment.

FIG. 2 is a diagram illustrating an example of multimodal dialog data, and FIG. 3 is an exemplary diagram illustrating generation of a token sequence according to an example embodiment.

In the example illustrated in FIG. 2, multimodal dialog data 200 may include three text messages 210, 220, and 230 uttered by a speaker "A" and the speaker "B," and an image 240 appearing between a first text message 210 and a second text message 220.

Referring to FIG. 3, the tokenizer 110 may generate a first token sequence 310 by tokenizing respective text messages 210, 220, and 230 included in the multimodal dialog data 200. In this case, a plurality of tokens generated by tokenizing the respective text message 210, 220, and 230 may be sequentially arranged in the first token sequence 310 according to appearance positions of the respective text messages 210, 220, and 230 in the multimodal dialog data 200.

The first token sequence 310 may include a [CLS] token, a [SOU] token, and a [SEP] token that are special tokens, in addition to the tokens generated by tokenizing the respective text messages 210, 220, and 230. In this case, the [CLS] token and the [SEP] token may be inserted as a first token and a last token of the first token sequence 310, respectively. The [SOU] token that is a special token for indicating a start position of each text message may be inserted before a first token among the tokens generated by tokenizing the respective text message 210, 220, and 230.

After the first token sequence 310 is generated, the token inserter 120 may generate a second token sequence 320 by inserting, based on an appearance position of the image 240 in the multimodal dialog data 200, a [IMG_0] token that is an image presence token, and a [IMG_X] token that is an image non-presence token into the first token sequence 310. Specifically, the image 240 may appear between the first text message 210 and the second text message 220 in the multimodal dialog data 200, and thus the token inserter 120 may insert the [IMG_O] token after a last token (that is, "up") for the first text message 210 among the tokens included in the first token sequence 310. In addition, the token inserter 120 may respectively insert the [IMG_X] token before a [SOU] token for the first text message 210, before a [SOU] token for the third text message 230, and after a last token (that is, "those") for the third text message 230.

Referring back to FIG. 1, the feature vector generator 130 may generate one or more feature vectors for the image included in the multimodal dialog data.

According to an example embodiment, each of the one or more feature vectors for the image may be a feature vector for a partial region in the image. As a specific example, the one or more feature vectors may be feature vectors for each of one or more objects included in the image. In this case, the feature vector generator 130 may generate the one or more feature vectors for the image using a pre-trained artificial neural network-based model to extract a feature vector for an object included in the image, such as a convolutional neural network (CNN)-based object detection model.

The trainer 140 may train an artificial neural network-based language model to predict, based on a second token sequence and the one or more feature vectors for the image included in the multimodal dialog data, an appearance position of the image in the multimodal dialog data.

According to an example embodiment, the language model may be, for example, a transformer-based language model, such as bidirectional encoder representations from transformers (BERT). However, an artificial neural network-based model capable of receiving a plurality of embedding vectors and generating an output vector corresponding to each of the plurality of embedding vectors is not necessarily limited to a specific type.

According to an example embodiment, the trainer 140 may train a language model using a first loss function based on an output vector of the language model for a mask token, and a second loss function based on a first similarity between an output vector of the language model for an image presence token and an output vector of the language model for one or more feature vectors for an image and a second similarity between an output vector of the language model for an image non-presence token and the output vector of the language model for the one or more feature vectors for the image.

Specifically, according to an example embodiment, the first loss function may be a cross entropy loss, as indicated in Equation 1 below.

$$L_{MLM} = -\mathbb{E}_{(u,t,i)} \log p(h_u | h_{\setminus u}, h_t, h_i) \qquad \text{[Equation 1]}$$

In addition, the second loss function may be, for example, a contrastive loss as indicated in Equation 2 below.

$$L_{cont.} = -\mathbb{E}_{(u,t,i)} \frac{\exp(sim(z_i(h_i), z_t(h_t))/\tau}{\sum \exp(sim(z_i(h_i), z_t(h_{\setminus t}))/\tau} \qquad \text{[Equation 2]}$$

In Equations 1 and 2, "u" indicates a text message included in multimodal dialog data, "t" indicates an image presence token and an image non-presence token, "i" indicates a feature vector for an image included in the multimodal dialog data, "$h_u$," "$h_t$," and "$h_i$" indicate output vectors of a language model for "u," "i," and "t," respectively. In addition, "τ," a temperature parameter that is a preset hyperparameter, indicates a value greater than 0, and "$z_i$" and "$z_t$" indicate linear projection. Here, "sim" indicates a similarity, and may be, for example, a cosine similarity.

Specifically, the trainer 140 may predict, based on the first loss function, a token replaced with the mask token in the first token sequence, and may train, based on the second loss function, the language model such that the first similarity increases and the second similarity decreases.

Figure 4:
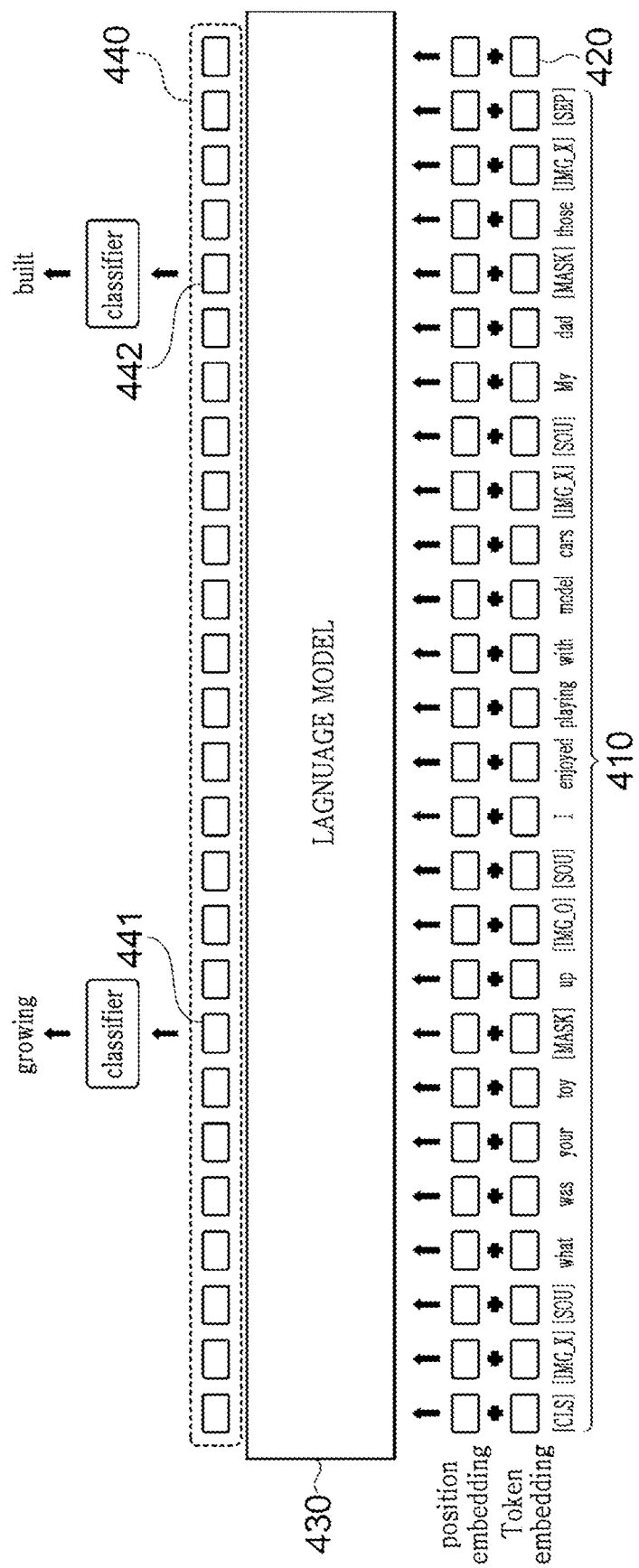
FIGS. 4 and 5 are exemplary diagrams illustrating training of a language model according to an example embodiment.
Figure 5:
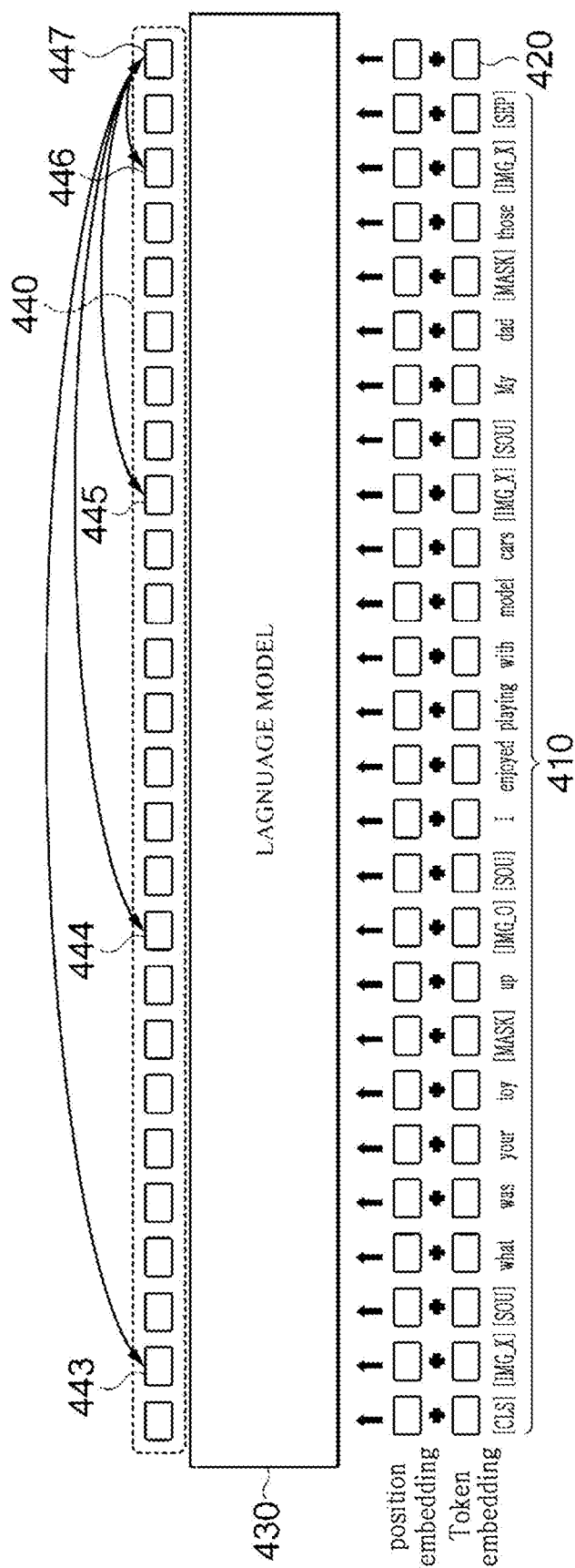

FIGS. 4 and 5 are exemplary diagrams illustrating training of a language model according to an example embodiment.

Referring to FIGS. 4 and 5, each token included in a second token sequence 410 may be converted into an embedding vector to be input to a language model 430 together with a feature vector 420 for an image included in multimodal dialog data.

In this case, according to an example embodiment, the embedding vector for each token included in the second token sequence 410 may be, for example, a value obtained by summing a token embedding vector and a position embedding vector for each token. Specifically, when the language model 430 is a BERT-based model, the token embedding vector for each token may be an embedding vector generated by wordpiece embedding, and the position embedding vector may be an embedding vector generated by position embedding. However, the embedding vector for each token included in the second token sequence 410 is not necessarily limited to the above-described example, and may be generated using various well-known embedding techniques according to a type of language model.

The feature vector 420 for the image in the multimodal dialog data may be, for example, a feature vector extracted from an object region included in the image using a pre-trained object detection model, and may be summed with the position embedding vector generated by position embedding, and then input to the language model 430 together with the embedding vector for each token included in the second token sequence 410.

In the examples illustrated in FIGS. 4 and 5, for ease of description, one feature vector 420 for an image is exemplified, but example embodiments are not limited thereto. For example, when a plurality of objects are included in the image, a plurality of feature vectors for the image may also be included.

The language model 430 may generate, from each embedding vector input to the language model 430, a plurality of output vectors 440 corresponding to each token and the feature vector 420 included in the second token sequence 410.

In this case, the trainer 140 may train the learning model 430 using the first loss function to predict an original token before being replaced with a mask token from output vectors 441 and 442 corresponding to the mask token among the plurality of output vectors 440 generated by the language model 430.

In addition, the trainer 140 may train the leaning model 430 using the second loss function such that a first similarity between an output vector 444 corresponding to an image presence token and an output vector 447 corresponding to the feature vector 420 increases, and a second similarity between output vectors 443, 445, and 446 corresponding to an image non-presence token and the output vector 447 corresponding to the feature vector 420 decreases, among the plurality of output vectors 440 generated by the language model 430.

Figure 6:
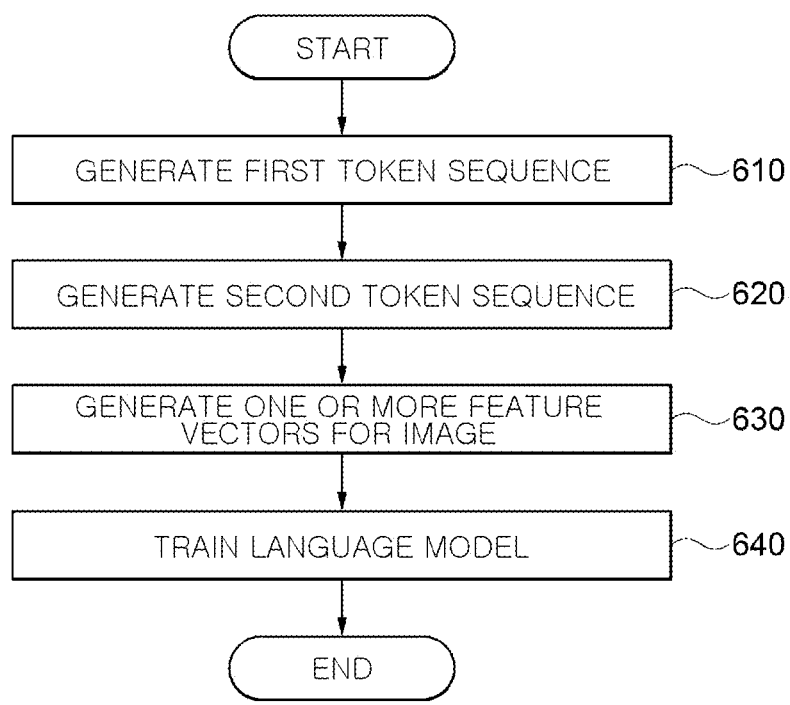
FIG. 6 is a flowchart illustrating a method for training a language model according to an example embodiment.

FIG. 6 is a flowchart illustrating a method for training a language model according to an example embodiment.

The method illustrated in FIG. 6 may be performed, for example, by the language model training apparatus 100 illustrated in FIG. 1.

Referring to FIG. 6, the language model training apparatus 100 may generate a first token sequence by tokenizing each of one or more text messages included in multimodal dialog data (610).

Then, the language model training apparatus 100 may generate a second token sequence by inserting, based on an appearance position of an image in the multimodal dialog data, one or more image presence tokens and one or more image non-presence tokens into the first token sequence, and replacing one or more tokens among a plurality of tokens included in the first token sequence with a mask token (620).

In this case, according to an example embodiment, the language model training apparatus 100 may insert an image presence token into a position corresponding to a position in which the image appears among a position immediately before or after each text message appears in the multimodal dialog data. In addition, the language model training apparatus 100 may insert an image non-presence token into a position corresponding to a position in which the image does not appear among the position immediately before or the position immediately after each text message appears in the multimodal dialog data.

Then, the language model training apparatus 100 may generate one or more feature vectors for the image included in the multimodal dialog data (630).

According to an example embodiment, each of the one or more feature vectors for the image may be a feature vector for a partial region in the image. As a specific example, the one or more feature vectors may be feature vectors for each of one or more objects included in the image.

Then, the language model training apparatus 100 may train an artificial neural network-based language model to predict, based on the second token sequence and the one or more feature vectors for the image included in the multimodal dialog data, the appearance position of the image in the multimodal dialog data (640).

In this case, according to an example embodiment, the language model training apparatus 100 may train a language model using a first loss function based on an output vector of the language model for a mask token, and a second loss function based on a first similarity between an output vector of the language model for the image presence token and an output vector of the language model for the one or more feature vectors for the image and a second similarity between an output vector of the language model for the image non-presence token and the output vector of the language model for the one or more feature vectors for the image.

Specifically, the language model training apparatus 100 may predict, based on the first loss function, a token replaced with the mask token in the first token sequence, and may train, based on the second loss function, the language model such that the first similarity increases and the second similarity decreases.

In the flowchart illustrated in FIG. 6, at least some of the operations at least some of the operations may be performed in a different order, may be performed in combination with other operations, may be omitted, or may be divided into sub-operations and performed, or unillustrated one or more operations may be added and performed.

Figure 7:
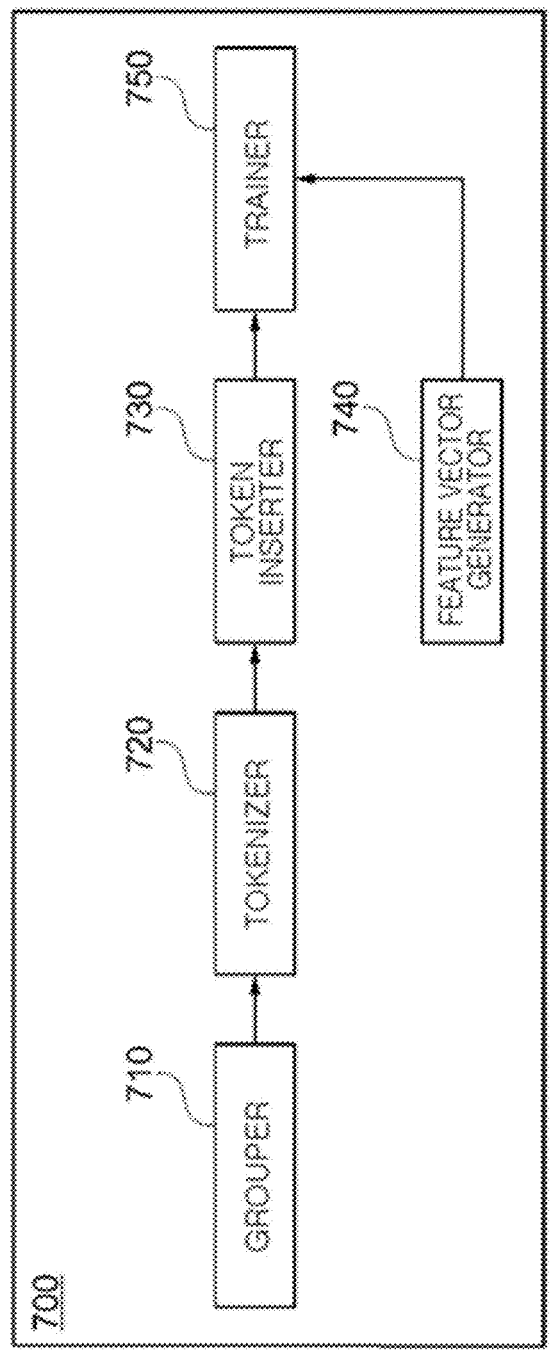
FIG. 7 is a block diagram illustrating an apparatus for training a language model according to another example embodiment.

FIG. 7 is a block diagram illustrating an apparatus for training a language model according to an example embodiment.

Referring to FIG. 7, a language model training apparatus 700 according to an example embodiment may include a grouper 710, a tokenizer 720, a token inserter 730, a feature vector generator 740, and a trainer 750.

According to an example embodiment, the grouper 710, the tokenizer 720, the token inserter 730, the feature vector generator 740, and the trainer 750 may be implemented by one or more hardware processors or a combination of one or more hardware processors and software, and may not be clearly distinguished in specific operations, unlike the illustrated example.

The grouper 710 may classify, based on an appearance position of an image included in first multimodal dialog data, one or more text messages included in multimodal dialog data into one or more message groups, and may generate second multimodal dialog data by changing appearance positions of the one or more message groups and the image in the first multimodal dialog data.

According to an example embodiment, the grouper 710 may classify one or more text messages appearing before an image appears in the first multimodal dialog data into one message group, and classify one or more text messages appearing after the image appears into another message group.

Figure 8:
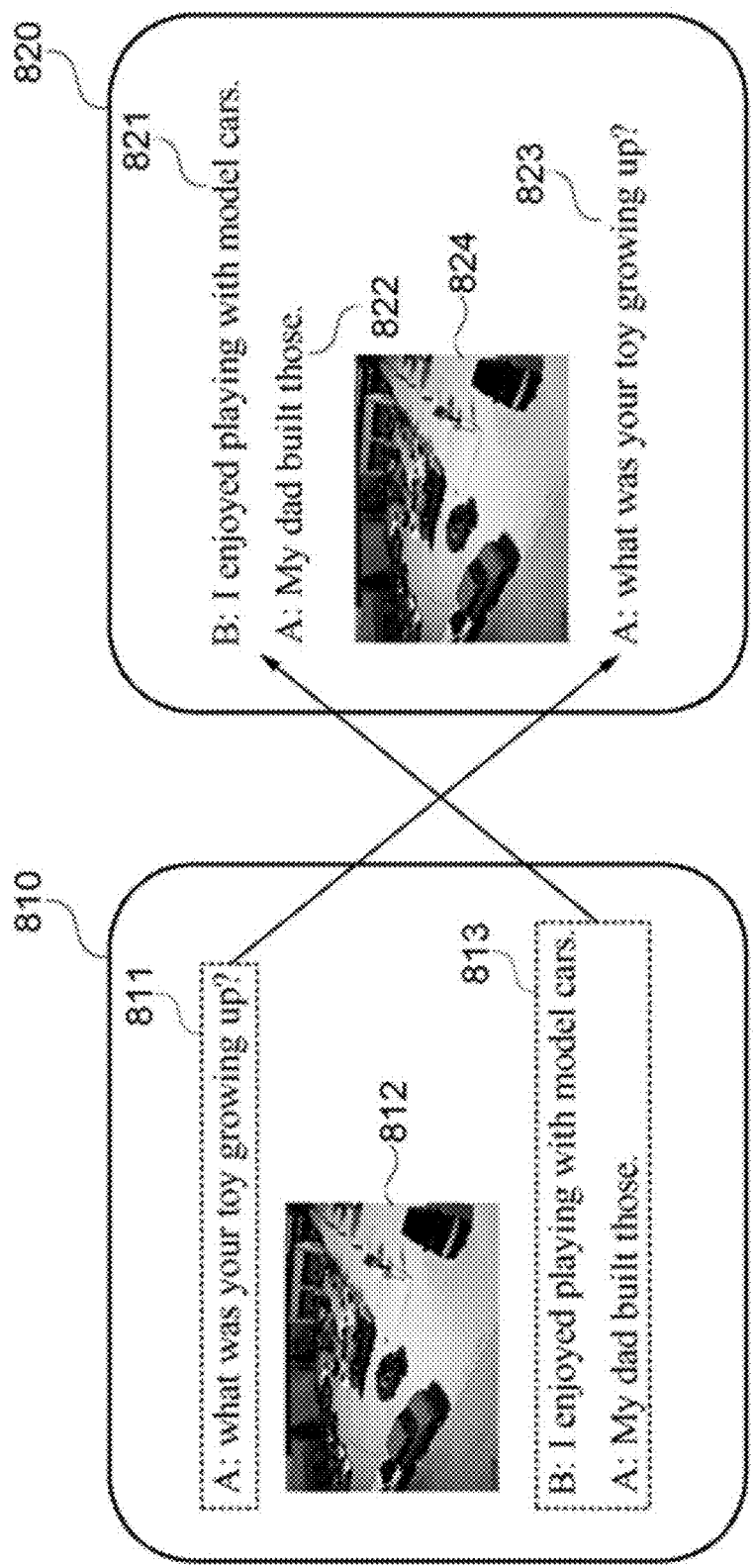
FIG. 8 is an exemplary diagram illustrating text message grouping according to an example embodiment.

Specifically, FIG. 8 is an exemplary diagram illustrating text message grouping according to an example embodiment.

Referring to FIG. 8, an image 812 may be included in first multimodal dialog data 810, a text message may appear before the image 812 appears, and two text messages may appear after the image 812 appears. In this case, the grouper 710 may classify the text message appearing before the image 812 appears in the first multimodal dialog data 810 into a first message group 811, and classify the two text messages appearing after the image appears into a second message group 813.

Then, the grouper 710 may generate second multimodal dialog data 820 by changing appearance positions of the first message group 811 and the second message group 813.

In the example illustrated in FIG. 8, it is exemplified that the second multimodal dialog data 820 may be generated by changing the appearance positions of the first message group 811 and the second message group 813, but example embodiments are limited thereto. Unlike the example illustrated in FIG. 8, the grouper 710 may generate the second multimodal dialog data 820 by arbitrarily changing appearance positions of the first message group 811, the image 812, and the second message group 813.

Referring back to FIG. 7, the tokenizer 720 may generate a first token sequence by tokenizing each of one or more text messages included in the second multimodal dialog data.

According to an example embodiment, the tokenizer 720 may tokenize each of the one or more text messages by dividing each of the one or more text messages included in the second multimodal dialog data in a preset unit. Specifically, the tokenizer 720 may tokenize, based on, for example, a character unit, a word unit, a subword unit, a morpheme unit, a whitespace unit, or the like, each of the one or more text messages included in the second multimodal dialog data. However, a unit for tokenization may be set in various manners in some example embodiments other than the above-described example.

The first token sequence may include a plurality of tokens generated by tokenizing respective text messages included in the second multimodal dialog data, and each of the plurality of tokens may be sequentially arranged in the first token sequence according to an appearance position thereof in the second multimodal dialog data.

In addition, according to an example embodiment, the first token sequence may further include one or more preset special tokens such as a token indicating start and end of a token sequence, a token for distinguishing a token for each text message, and the like, in addition to the plurality of tokens generated by tokenizing the respective text message included in the second multimodal dialog data.

The token inserter 730 may generate a second token sequence by inserting, based on an appearance position of an image in the second multimodal dialog data, one or more image presence tokens and one or more image non-presence tokens into the first token sequence.

According to an example embodiment, the token inserter 730 may insert an image presence token into a position corresponding to a position in which the image appears among a position immediately before or after each text message appears in the second multimodal dialog data. In addition, the token inserter 730 may insert an image non-presence token into a position corresponding to a position in which the image does not appear among the position immediately before or the position immediately after each text message appears in the second multimodal dialog data.

Figure 9:
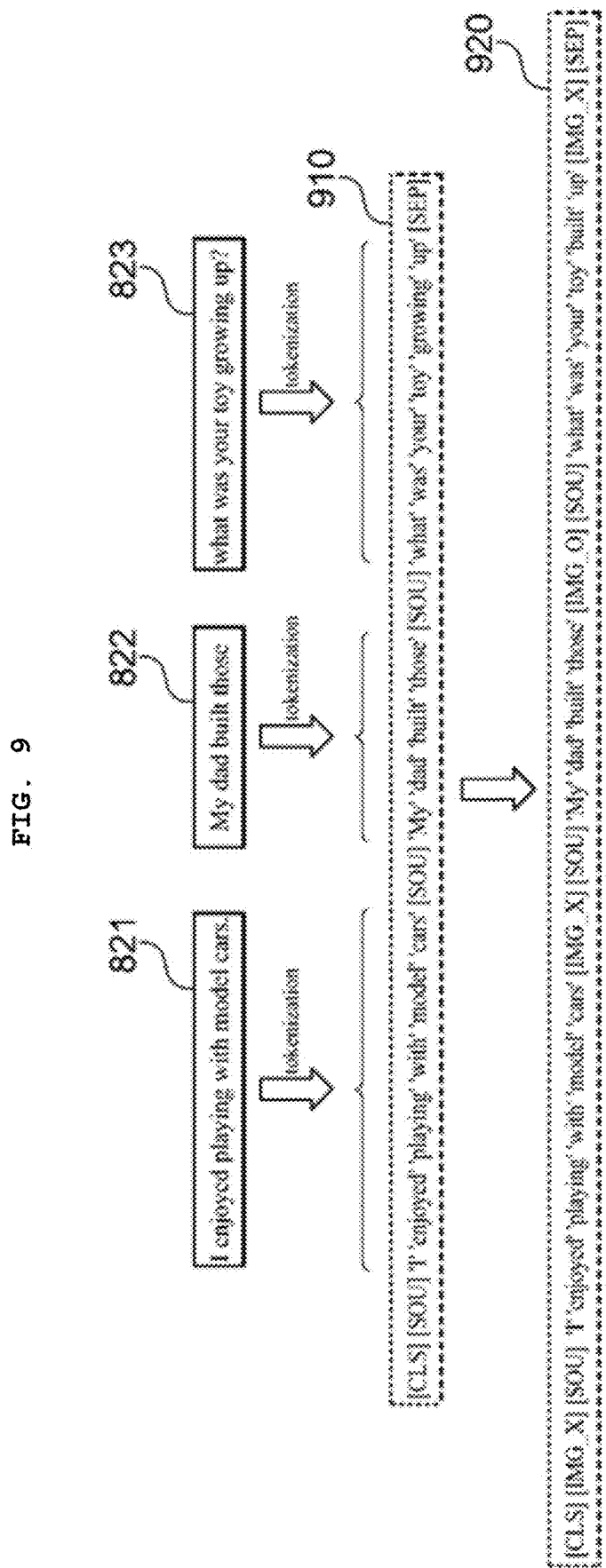
FIG. 9 is an exemplary diagram illustrating generation of a token sequence according to an example embodiment.

FIG. 9 is an exemplary diagram illustrating generation of a token sequence according to an example embodiment.

Specifically, FIG. 9 illustrates an example of generating a token sequence from the second multimodal dialog data 820 illustrated in FIG. 8.

Referring to FIGS. 8 and 9, in the example illustrated in FIG. 8, the second multimodal dialog data 820 may include three text messages 821, 822, and 823 uttered by a speaker "A" and a speaker "B," and an image 824 appearing between a second text message 822 and a third text message 823.

Referring to FIG. 9, the tokenizer 720 may generate a first token sequence 910 by tokenizing respective text messages 821, 822, and 823 included in the second multimodal dialog data 820. In this case, a plurality of tokens generated by tokenizing the respective text message 821, 822, and 823 may be sequentially arranged in the first token sequence 910 according to appearance positions of the respective text messages 821, 822, and 823 in the second multimodal dialog data 820.

The first token sequence 910 may include a [CLS]token, a [SOU] token, and a [SEP] token that are special tokens, in addition to the tokens generated by tokenizing the respective text messages 821, 822, and 823. In this case, the [CLS] token and the [SEP] token may be inserted as a first token and a last token of the first token sequence 910, respectively. The [SOU] token may be inserted before a first token among the tokens generated by tokenizing the respective text message 821, 822, and 823.

After the first token sequence 910 is generated, the token inserter 730 may generate a second token sequence 920 by inserting, based on an appearance position of the image 824 in the second multimodal dialog data 820, a [IMG_O] token that is an image presence token, and a [IMG_X] token that is an image non-presence token into the first token sequence 910. Specifically, the image 824 may appear between the second text message 822 and the third text message 823 in the second multimodal dialog data 820, and thus the token inserter 730 may insert the [IMG_O] token after a last token (that is, "those") for the second text message 822 among the tokens included in the first token sequence 910. In addition, the token inserter 730 may respectively insert the [IMG_X] token before a [SOU] token for the first text message 821, before a [SOU] token for the second text message 822, and after a last token (that is, "up") for the third text message 823.

Referring back to FIG. 7, the feature vector generator 740 may generate one or more feature vectors for the image included in the second multimodal dialog data.

According to an example embodiment, each of the one or more feature vectors for the image may be a feature vector for a partial region in the image. As a specific example, the one or more feature vectors may be feature vectors for each of one or more objects included in the image. In this case, the feature vector generator 640 may generate the one or more feature vectors for the image using a pre-trained artificial neural network-based model to extract a feature vector for an object included in the image, such as a CNN-based object detection model.

The trainer 750 may train an artificial neural network-based language model to predict, based on a second token sequence and the one or more feature vectors for the image included in the second multimodal dialog data, appearance positions in the first multimodal dialog data of one or more message groups and the image included in the second multimodal dialog data.

According to an example embodiment, the language model may be, for example, a transformer-based language model such as BERT. However, when the language model is an artificial neural network-based model capable of outputting a feature from input embedding generated from multimodal dialog data, the language model is not limited thereto.

According to an example embodiment, the trainer 750 may train the language model using a loss function based on maximum likelihood estimation (MLE). As a specific example, the loss function may be a loss function based on listwise maximum likelihood estimation (ListMLE), as indicated in Equation 3 below.

$$L_{TOP} = \text{ListMLE}([g(h_{s_1}), g(h_{s_2}), g(h_{t_1})], y) \quad [\text{Equation 3}]$$

In Equation 3, "$s_1$" and "$s_2$" respectively indicate an SOU token for a message group included in the second multimodal dialog data, "$t_1$" indicates an image presence token, and $h_{s_1}$, $h_{s_2}$, and $h_{t_1}$ indicate output vectors of a language model for $s_1$, $s_2$, and $t_1$, respectively. In addition, "g" indicates a multi-layer perceptron (MLP), and "y" indicates a label for appearance positions of $s_1$, $s_2$, and $t_1$.

Specifically, the trainer 750 may train the language model to predict the appearance positions in the first multimodal dialog data of the one or more message groups and the image included in the second multimodal dialog data in which the loss function is maximized.

Figure 10:
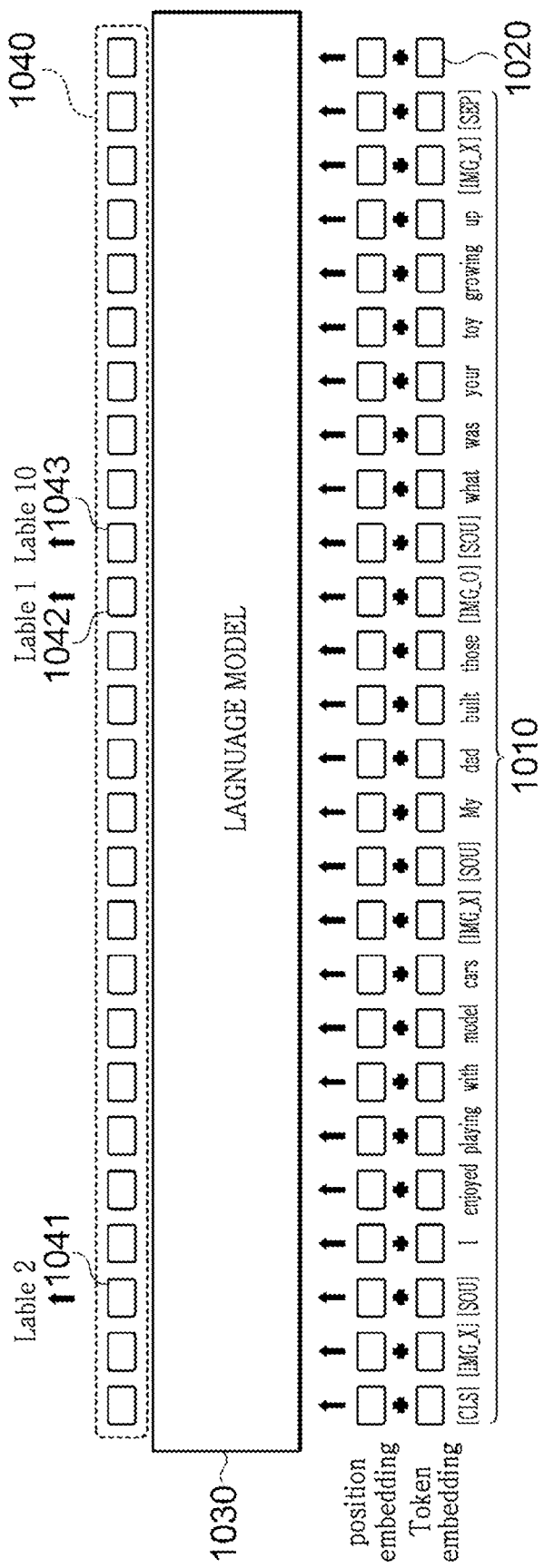
FIG. 10 is an exemplary diagram illustrating training of a language model according to an example embodiment.

FIG. 10 is an exemplary diagram illustrating training of a language model according to an example embodiment.

Referring to FIG. 10, each token included in a second token sequence 1010 may be converted into an embedding vector to be input to a language model 1030 together with a feature vector 1020 for an image included in second multimodal dialog data.

In this case, according to an example embodiment, the embedding vector for each token included in the second token sequence 1010 may be, for example, a value obtained by summing a token embedding vector and a position embedding vector for each token. Specifically, when the language model 1030 is a BERT-based model, the token embedding vector for each token may be an embedding vector generated by wordpiece embedding, and the position embedding vector may be an embedding vector generated by position embedding. However, the embedding vector for each token included in the second token sequence 410 is not necessarily limited to the above-described example, and may be generated using various well-known embedding techniques according to a type of language model.

The feature vector 1020 for the image in the second multimodal dialog data may be, for example, a feature vector extracted from an object region included in the image using a pre-trained object detection model, and may be summed with the position embedding vector generated by position embedding, and then input to the language model 1030 together with the embedding vector for each token included in the second token sequence 1010. In the example illustrated in FIG. 10, for ease of description, one feature vector 1020 for an image is exemplified, but example embodiments are not limited thereto. For example, when a plurality of objects are included in the image, a plurality of feature vectors for the image may also be included.

The language model 1030 may generate, from each embedding vector input to the language model 1030, a plurality of output vectors 1040 corresponding to each token and the feature vector 1020 included in the second token sequence 1010.

The trainer 750 may estimate, using a loss function, a label indicating an appearance position in first multimodal dialog data with respect to each of output vectors 1041 and 1043 for a SOU token at start positions of respective message groups and an output vector 1042 corresponding to an image presence token (that is, IMG_O token) among a plurality of output vectors 1040 generated by the language model 1030, and may train, based on the loss function, the language model 1030 such that the estimated appearance position corresponds to an original appearance position in the first multimodal dialog data.

Figure 11:
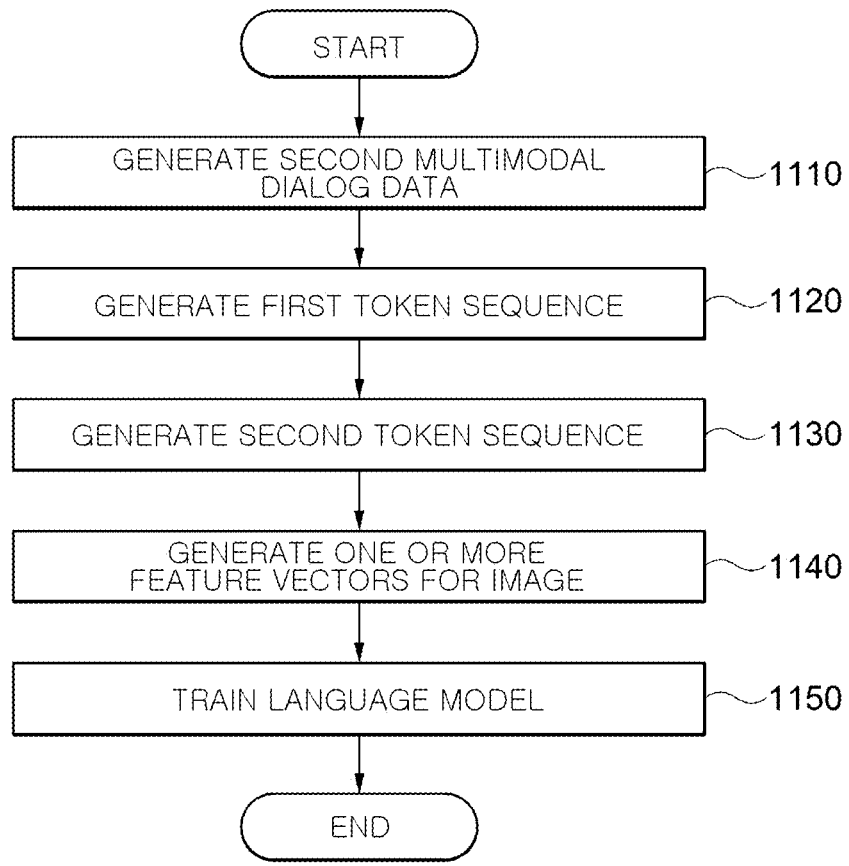
FIG. 11 is a flowchart illustrating a method for training a language model according to an example embodiment.

FIG. 11 is a flowchart illustrating a method for training a language model according to an example embodiment.

The method illustrated in FIG. 11 may be performed by, for example, the language model training apparatus 700 illustrated in FIG. 7.

Referring to FIG. 11, the language model training apparatus 700 may classify, based on a position of an image included in first multimodal dialog data, one or more text messages included in the first multimodal dialog data into one or more message groups, and may generate second multimodal dialog data by changing appearance positions of the one or more message groups and the image in the first multimodal dialog data (1110).

Then, the language model training apparatus 700 may generate a first token sequence by tokenizing each of one or more text messages included in the second multimodal dialog data (1120).

Then, the language model training apparatus 700 may generate a second token sequence by inserting, based on an appearance position of an image in the second multimodal dialog data, one or more image presence tokens and one or more image non-presence tokens into the first token sequence (1130).

In this case, according to an example embodiment, the language model training apparatus 700 may insert an image presence token into a position corresponding to a position in which the image appears among a position immediately before or after each text message appears in the second multimodal dialog data. In addition, the language model training apparatus 100 may insert an image non-presence token into a position corresponding to a position in which the image does not appear among the position immediately before or the position immediately after each text message appears in the second multimodal dialog data.

Then, the language model training apparatus 700 may generate one or more feature vectors for the image included in the second multimodal dialog data (1140).

According to an example embodiment, each of the one or more feature vectors for the image may be a feature vector for a partial region in the image. As a specific example, the one or more feature vectors may be feature vectors for each of one or more objects included in the image.

Then, the language model training apparatus 700 may train an artificial neural network-based language model to predict, based on the second token sequence and the one or more feature vectors for the image included in the second multimodal dialog data, appearance positions in the first multimodal dialog data of one or more message groups and the image included in the second multimodal dialog data (1150).

In this case, according to an example embodiment, the language model training apparatus 700 may learn a language model using a loss function based on maximum likelihood estimation. Specifically, the language model training apparatus 700 may train the language model to predict the appearance positions in the first multimodal dialog data of the one or more message groups and the image included in the second multimodal dialog data in which the loss function is maximized.

In the flowchart illustrated in FIG. 11, at least some of the operations at least some of the operations may be performed in a different order, may be performed in combination with other operations, may be omitted, or may be divided into sub-operations and performed, or unillustrated one or more operations may be added and performed.

Figure 12:
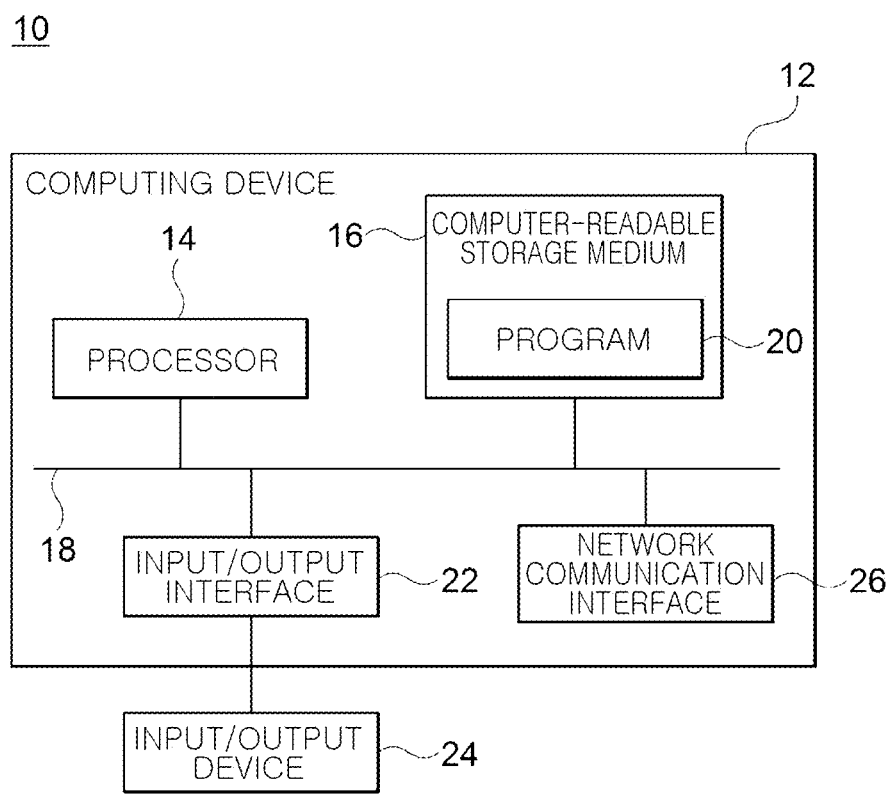
FIG. 12 is a block diagram illustrating a computing environment including a computing device according to an example embodiment.

FIG. 12 is an exemplary block diagram illustrating a computing environment including a computing device in an example embodiment. In the illustrated example embodiment, respective components may have different functions and capabilities in addition to those described below, and additional components may be included in addition to those described below.

An illustrated computing environment 10 may include a computing device 12. The computing device 12 may be one or more components included in the language model training apparatuses 100 and 700 according to an example embodiment.

The computing device 12 may include at least one processor 14, a computer-readable storage medium 16, and a communication bus 18. The processor 14 may cause the computing device 12 to operate according to the example embodiments described above. For example, the processor 14 may execute one or more programs stored on the computer-readable storage medium 16. The one or more programs may include one or more computer-executable instructions, which, when executed by the processor 14, may be configured to cause the computing device 12 to perform operations according to example embodiments.

The computer-readable storage medium 16 may be configured to store the computer-executable instruction or program code, program data, and/or other suitable forms of information. A program 20 stored in the computer-readable storage medium 16 may include a set of instructions executable by the processor 14. In an example embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and are capable of storing desired information, or any suitable combination thereof.

The communication bus 18 may interconnect various other components of the computing device 12, including the processor 14 and the computer-readable storage medium 16.

The computing device 12 may also include one or more input/output interfaces 22 providing an interface for one or more input/output devices 24, and one or more network communication interfaces 26. The input/output interface 22 and the network communication interface 26 may be connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touchpad or touchscreen), a voice or sound input device, input devices such as various types of sensor devices and/or imaging devices, and/or output devices such as a display device, a printer, a speaker, and/or a network card. The exemplary input/output device 24 may be included in the computing device 12 as a component included in the computing device 12, or may be connected to the computing device 12 as a device distinct from the computing device 12.

While example embodiments have been shown and described above, it will be apparent to those skilled in the art that modifications and variations could be made without departing from the scope of the present disclosure as defined by the appended claims.

What is claimed is:

1. A method for training a language model for multimodal dialog, the method comprising:
generating a first token sequence of a plurality of first tokens obtained by tokenizing one or more text messages included in multimodal dialog data;
generating a second token sequence by inserting, into the first token sequence, one or more image presence tokens at an appearance position of an image included in the multimodal dialog data and one or more image non-presence tokens at a position in which the image does not appear in the multimodal dialog data, and replacing one or more first tokens among the plurality of first tokens with a mask token;
generating one or more feature vectors for the image; and
training an artificial neural network-based language model to predict, based on the second token sequence and the one or more feature vectors, the position in which the image appears in the multimodal dialog data.

2. The method of claim 1, wherein the generating of the second token sequence comprises:
generating the second token sequence by inserting each of the one or more image presence tokens into a position corresponding to a position in which the image appears among positions immediately before and after each of the one or more text messages appears in the multimodal dialog data, and inserting each of the one or more image non-presence tokens into a position corresponding to a position in which the image does not appear among the positions immediately before and the position immediately after each of the one or more text messages appears in the multimodal dialog data.

3. The method of claim 1, wherein the training includes:
training the artificial neural network-based language model using a loss function comprising:
a first loss function based on an output vector of the artificial neural network-based language model for the mask token; and
a second loss function based on a first similarity between an output vector of the artificial neural network-based language model for the one or more image presence tokens and an output vector of the artificial neural network-based language model for the one or more feature vectors and a second similarity between an output vector of the artificial neural network-based language model for the one or more image non-presence tokens and the output vector of the artificial neural network-based language model for the one or more feature vectors.

4. The method of claim 3, wherein the training includes:
predicting, based on the first loss function, the one or more first tokens replaced with the mask token in the first token sequence, and training, based on the second loss function, the artificial neural network-based language model such that the first similarity increases and the second similarity decreases.

5. An apparatus for training a language model for multimodal dialog, the apparatus comprising at least one processor and a computer-readable storage medium storing one or more programs executed by the at least one processor, the one or more programs comprising one or more computer-executable instructions for:
a tokenizer configured to generate a first token sequence of a plurality of first tokens obtained by tokenizing one or more text messages included in multimodal dialog data;
a token inserter configured to generate a second token sequence by inserting, into the first token sequence, one or more image presence tokens at an appearance position of an image included in the multimodal dialog data and one or more image non-presence tokens at a position in which the image does not appear in the multimodal dialog data, and replacing one or more first tokens among the plurality of first tokens with a mask token;
a feature vector generator configured to generate one or more feature vectors for the image; and a trainer configured to train an artificial neural network-based language model to predict, based on the second token sequence and the one or more feature vectors, the position in which the image appears in the multimodal dialog data.

6. The apparatus of claim 5, wherein the token inserter is configured to generate the second token sequence by inserting each of the one or more image presence tokens into a position corresponding to a position in which the image appears among positions immediately before and after each of the one or more text messages appears in the multimodal dialog data, and inserting each of the one or more image non-presence tokens into a position corresponding to a position in which the image does not appear among the positions immediately before and the position immediately after each of the one or more text messages appears in the multimodal dialog data.

7. The apparatus of claim 5, wherein the trainer is configured to train the artificial neural network-based language model using a loss function comprising:
a first loss function based on an output vector of the artificial neural network-based language model for the mask token; and
a second loss function based on a first similarity between an output vector of the artificial neural network-based language model for the one or more image presence tokens and an output vector of the artificial neural network-based language model for the one or more feature vectors and a second similarity between an output vector of the artificial neural network-based language model for the one or more image non-presence tokens and the output vector of the artificial neural network-based language model for the one or more feature vectors.

8. The apparatus of claim 7, wherein the trainer is configured to predict, based on the first loss function, the one or more first tokens replaced with the mask token in the first token sequence, and to train, based on the second loss function, the artificial neural network-based language model such that the first similarity increases and the second similarity decreases.

9. A method for training a language model for multimodal dialog, the method comprising:
classifying, based on an appearance position of an image included in first multimodal dialog data, one or more text messages included in the first multimodal dialog data into one or more message groups;
generating second multimodal dialog data by changing appearance positions of the one or more message groups and the image in the first multimodal dialog data;
generating a first token sequence of a plurality of first tokens obtained by tokenizing respective text messages included in the one or more message groups in the second multimodal dialog data;
generating a second token sequence in which one or more image presence tokens are inserted into the first token sequence at the appearance position of the image in the second multimodal dialog data and one or more image non-presence tokens are inserted into the first token sequence at a position in which the image does not appear in the second multimodal dialog data;
generating one or more feature vectors for the image in the second multimodal dialog data; and
training an artificial neural network-based language model to predict, based on the second token sequence and the one or more feature vectors, the positions in which the image and the one or more message groups appear in the first multimodal dialog data.

10. The method of claim 9, wherein the generating of the second token sequence comprises:
generating the second token sequence by inserting each of the one or more image presence tokens into a position corresponding to a position in which the image appears among positions immediately before and after each of the one or more text messages appears in the second multimodal dialog data, and inserting each of the one or more image non-presence tokens into a position corresponding to a position in which the image does not appear among the position immediately before and the position immediately after each of the one or more text messages appears in the second multimodal dialog data.

11. The method of claim 9, wherein the training includes:
training the artificial neural network-based language model using a loss function based on maximum likelihood estimation.

12. The method of claim 11, wherein the second token sequence includes a special token indicating start of each of the one or more message groups, and
the training includes predicting, based on an output vector of the artificial neural network-based language model for each of the special token and the one or more image presence tokens, the appearance position of each of the one or more message groups and the image in the first multimodal dialog data, and training the artificial neural network-based language model such that the loss function is maximized.

13. An apparatus for training a language model for multimodal dialog, the apparatus comprising at least one processor and a computer-readable storage medium storing one or more programs executed by the at least one processor, the one or more programs comprising one or more computer-executable instructions for:
a grouper configured to classify, based on an appearance position of an image included in first multimodal dialog data, one or more text messages included in the first multimodal dialog data into one or more message groups, and to generate second multimodal dialog data by changing appearance positions of the one or more message groups and the image in the first multimodal dialog data;
a tokenizer configured to generate a first token sequence of a plurality of first tokens obtained by tokenizing respective text messages included in the one or more message groups in the second multimodal dialog data;
a token inserter configured to generate, based on the appearance position of the image in the second multimodal dialog data, a second token sequence in which one or more image presence tokens are inserted into the first token sequence at a position in which the image appears in the second multimodal dialog data and one or more image non-presence tokens are inserted into the first token sequence at a position in which the image does not appear in the second multimodal dialog data;
a feature vector generator configured to generate one or more feature vectors for the image in the second multimodal dialog data; and
a trainer configured to train an artificial neural network-based language model to predict, based on the second token sequence and the one or more feature vectors, the positions in which of the image and the one or more message groups appear in the first multimodal dialog data.

14. The apparatus of claim 13, wherein the token inserter is configured to generate the second token sequence by inserting each of the one or more image presence tokens into a position corresponding to a position in which the image appears among positions immediately before and after each of the one or more text messages appears in the second multimodal dialog data, and inserting each of the one or more image non-presence tokens into a position corresponding to a position in which the image does not appear among the positions immediately before and the position immediately after each of the one or more text messages appears in the second multimodal dialog data.

15. The apparatus of claim 13, wherein the trainer is configured to train the artificial neural network-based language model using a loss function based on maximum likelihood estimation.

16. The apparatus of claim 15, wherein the second token sequence includes a special token indicating start of each of the one or more message groups; and the trainer is configured to predict, based on an output vector of the artificial neural network-based language model for each of the special token and the one or more image presence tokens, the appearance position of each of the one or more message groups and the image in the first multimodal dialog data, and to train the artificial neural network-based language model such that the loss function is maximized.

\* \* \* \* \*